(12) United States Patent
Mizuno et al.

(10) Patent No.: US 7,523,913 B2
(45) Date of Patent: Apr. 28, 2009

(54) SEAT POSITION ADJUSTING APPARATUS FOR VEHICLE

(75) Inventors: Ryousuke Mizuno, Toyota (JP); Yasuhiro Kojima, Kariya (JP)

(73) Assignee: Aisin Seiki Kabuishiki Kaisha (JP)

( * ) Notice: Subject to any disclaimer, the term of this patent is extended or adjusted under 35 U.S.C. 154(b) by 0 days.

(21) Appl. No.: 11/860,860

(22) Filed: Sep. 25, 2007

(65) Prior Publication Data

US 2008/0084085 A1  Apr. 10, 2008

(30) Foreign Application Priority Data

Oct. 4, 2006  (JP) .............................. 2006-272525

(51) Int. Cl.
*F16M 13/00* (2006.01)

(52) U.S. Cl. .................................... 248/429

(58) Field of Classification Search ................ 248/424, 248/429, 430; 296/65.13, 13; 297/341
See application file for complete search history.

(56) References Cited

U.S. PATENT DOCUMENTS

| | | | | | |
|---|---|---|---|---|---|
| 5,020,853 | A | * | 6/1991 | Babbs | 297/341 |
| 5,918,846 | A | * | 7/1999 | Garrido | 248/429 |
| 6,098,946 | A | * | 8/2000 | Sechet et al. | 248/424 |
| 6,102,478 | A | * | 8/2000 | Christopher | 297/341 |
| 6,513,868 | B1 | * | 2/2003 | Tame | 297/341 |
| 6,767,063 | B1 | * | 7/2004 | Abdella et al. | 297/378.12 |
| 6,945,607 | B2 | * | 9/2005 | Kojima | 297/341 |
| 7,025,419 | B2 | | 4/2006 | Sasaki et al. | |
| 7,195,303 | B2 | * | 3/2007 | Nihonmatsu et al. | 296/65.13 |
| 7,318,573 | B2 | * | 1/2008 | Yamada et al. | 248/424 |
| 2006/0214460 | A1 | * | 9/2006 | Kojima | 296/65.13 |
| 2007/0120407 | A1 | * | 5/2007 | Kojima | 297/344.11 |

FOREIGN PATENT DOCUMENTS

JP  2005-29104  2/2005

* cited by examiner

*Primary Examiner*—Ramon O Ramirez
(74) *Attorney, Agent, or Firm*—Oblon, Spivak, McClelland, Maier & Neustadt, P.C.

(57) ABSTRACT

A seat position adjusting apparatus for a vehicle includes a lower rail, an upper rail moved relatively with the lower rail, a locking mechanism restricting relative movement between the lower rail and the upper rail and releasing restriction on the relative movement, an operating member releasing restriction of the locking mechanism on the relative movement between the lower rail and the upper rail, a position memorizing mechanism for memorizing a position of the upper rail relative to the lower rail, a memorized position releasing member releasing the memorized position of the upper rail relative to the lower rail, wherein the position memorizing mechanism includes a movable member, an engaging member and a biasing member that has a first operating arm portion and a second operating arm portion that are positioned at two points on the engaging member with maintaining a predetermined distance therebetween in order to exert the operation force at the two points.

9 Claims, 9 Drawing Sheets

SEAT POSITION ADJUSTING APPARATUS FOR VEHICLE

CROSS REFERENCE TO RELATED APPLICATIONS

This application is based on and claims priority under 35 U.S.C. § 119 to Japanese Patent Application 2006-272525, filed on Oct. 4, 2006, the entire contents of which is incorporated herein by reference.

FIELD OF THE INVENTION

The present invention relates to an apparatus that adjusts a position of a seat by adjusting a relative position between a lower rail fixed to a vehicle floor and an upper rail fixed to the seat. Specifically, the present invention relates to a so-called seat position adjusting apparatus having a walk-in function.

BACKGROUND

As disclosed in JP2005029104A, a position memorizing mechanism provided to the seat position adjusting apparatus includes a movable member that is supported by a sub rail fixed to a lower rail so as to be movable forwards and backwards in a seat position adjusting direction. Further, an engaging member is provided to the position memorizing mechanisms in a manner where it is supported by the movable member. The engaging member is engageable/disengageable with/from the sub rail. The seat position adjusting apparatus includes a biasing member that exerts operation force to the engaging member so as to be engaged with the sub rail for preventing the movable member from being moved relative to the sub rail, where an operating member of the seat position adjusting apparatus is not operated to adjust a position of the seat.

However, with the configuration of the seat position adjusting apparatus disclosed in JP2005029104A, the biasing member is configured to apply the operation force concentrated on one point on the engaging member. Therefore, when the engaging member is moved in order to engage/disengage with/from the sub rail, a posture of the engaging member may become inclinable and unstable. As a result, operational stability of the seat position adjusting apparatus may not be achieved with the seat position adjusting apparatus disclosed in JP2005029104A.

A need thus exists for a seat position adjusting apparatus which is not susceptible to the drawback mentioned above.

SUMMARY OF THE INVENTION

A seat position adjusting apparatus for a vehicle includes a lower rail fixed to a floor of a vehicle, an upper rail fixed to a seat and being relatively movable with the lower rail, a locking mechanism restricting relative movement between the lower rail and the upper rail, and the locking mechanism releasing restriction on the relative movement between the lower rail and the upper rail, an operating member releasing restriction of the locking mechanism on the relative movement between the lower rail and the upper rail, a position memorizing mechanism for memorizing a position of the upper rail relative to the lower rail, a memorized position releasing member releasing the position of the upper rail relative to the lower rail memorized by the position memorizing mechanism, when the operating member is operated, a sub rail fixed to the lower rail, a movable member provided to the position memorizing mechanism and being supported by the sub rail so as to be moved in a position adjusting direction of the seat, an engaging member supported by the movable member so as to be engageable/disengageable with/from the sub rail, and a biasing member exerting operation force to the engaging member in order to engage the sub rail and the engaging member when the memorized position releasing member is spaced from the engaging member, wherein the biasing member includes a first operating arm portion and a second operating arm portion that are positioned at two points on the engaging member with a certain interval therebetween in order to exert the operation force at the two points

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

The embodiment of the present invention will be described in accordance with the attached drawings.

Figure 12:
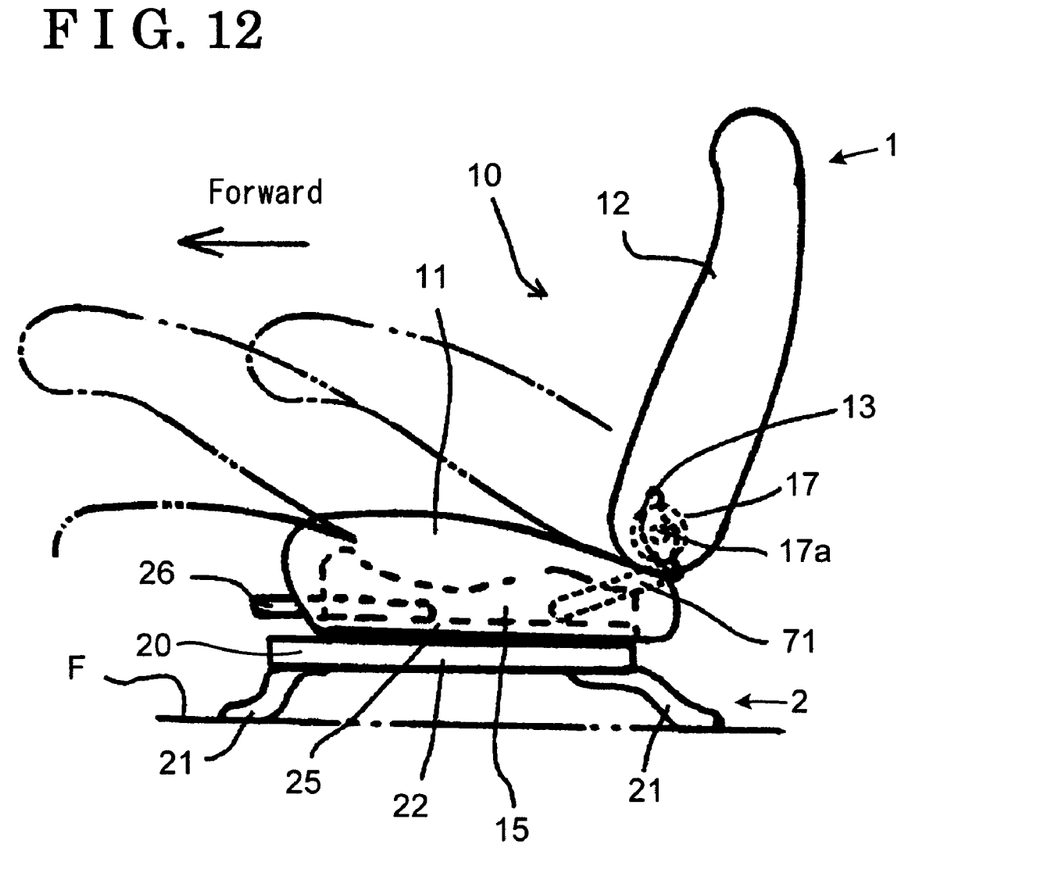
FIG. 12 is a side view of an interlocking mechanism related to the embodiment.

FIG. 12 illustrates a seat apparatus 1 that includes a seat position adjusting apparatus 2 according to the embodiment of the present invention. The seat position adjusting apparatus 2 is attached to the seat apparatus 1 so as to support a seat 10 upon a floor F of a vehicle. The seat 10 includes a seat cushion 11 and a seat back 12.

The seat position adjusting apparatus 2 has a so-called seat sliding function as a basic function. The seat position adjusting apparatus 2 enables a seat position being adjustable relative to the floor F of the vehicle in forward and backward direction indicated in FIG. 12, and further, the seat position adjusting apparatus 2 retains an adjusted position of the seat 10.

In addition to the seat sliding function, the seat position adjusting apparatus 2 includes a walk-in function with which the seat back 12 of the seat 10, such as a driver's seat or a passenger's seat, is sufficiently inclined forward to swing the seat back 12 to positions illustrated with a chain double-dashed lines in FIG. 12. Then, the seat 10 is consequently moved forward so that an occupant of the vehicle easily gets in a vehicle so as to be seated on a back seat (not shown) and so that the occupant of the vehicle easily off the back seat so as to get out the vehicle. Furthermore, the seat position adjusting apparatus 2 includes a position memorizing mechanism 50 (see FIG. 6 and FIG. 7), which will be described below, for memorizing an original position of the seat 10 in a longitudinal direction of an lower rail 22, which is described below, before a walk-in operation is conducted by the occupant and for enabling the seat 10 to be restored to the original position (a memorized position).

In order to achieve the seat sliding function, a pair of sliding devices 20 is provided at the seat position adjusting apparatus 2. The pair of sliding devices 20 extends back and forth in a longitudinal direction of the seat 10. Specifically, one of the sliding devices 20 is arranged at the left of a bottom portion of the seat 10 and the other sliding device 20 is arranged at the right of the bottom portion of the seat 10.

Figure 1:
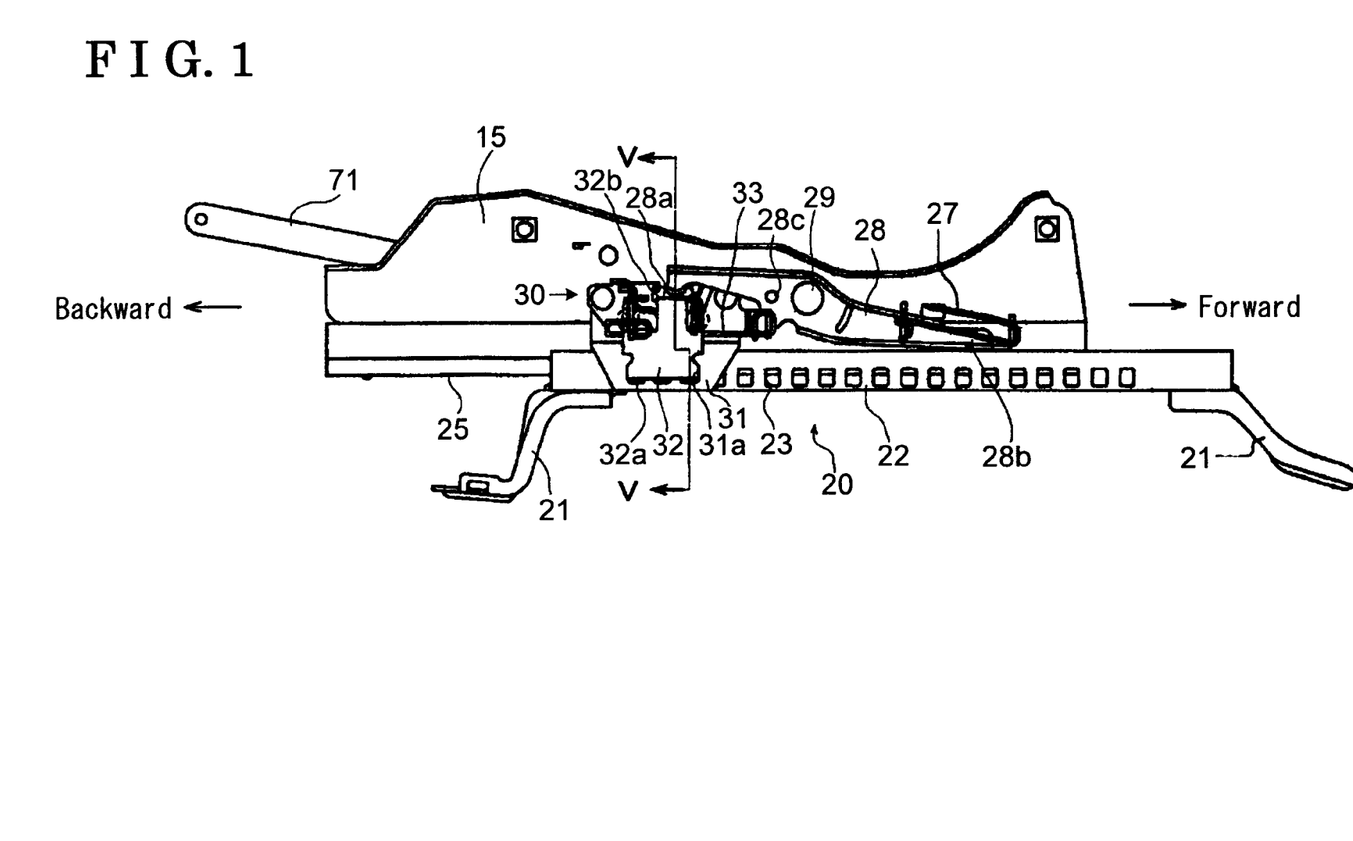
FIG. 1 is a side view of a seat sliding device, which has a position memorizing mechanism related to the embodiment and is provided to a left side of the seat, viewed from inside of the seat.
Figure 2:
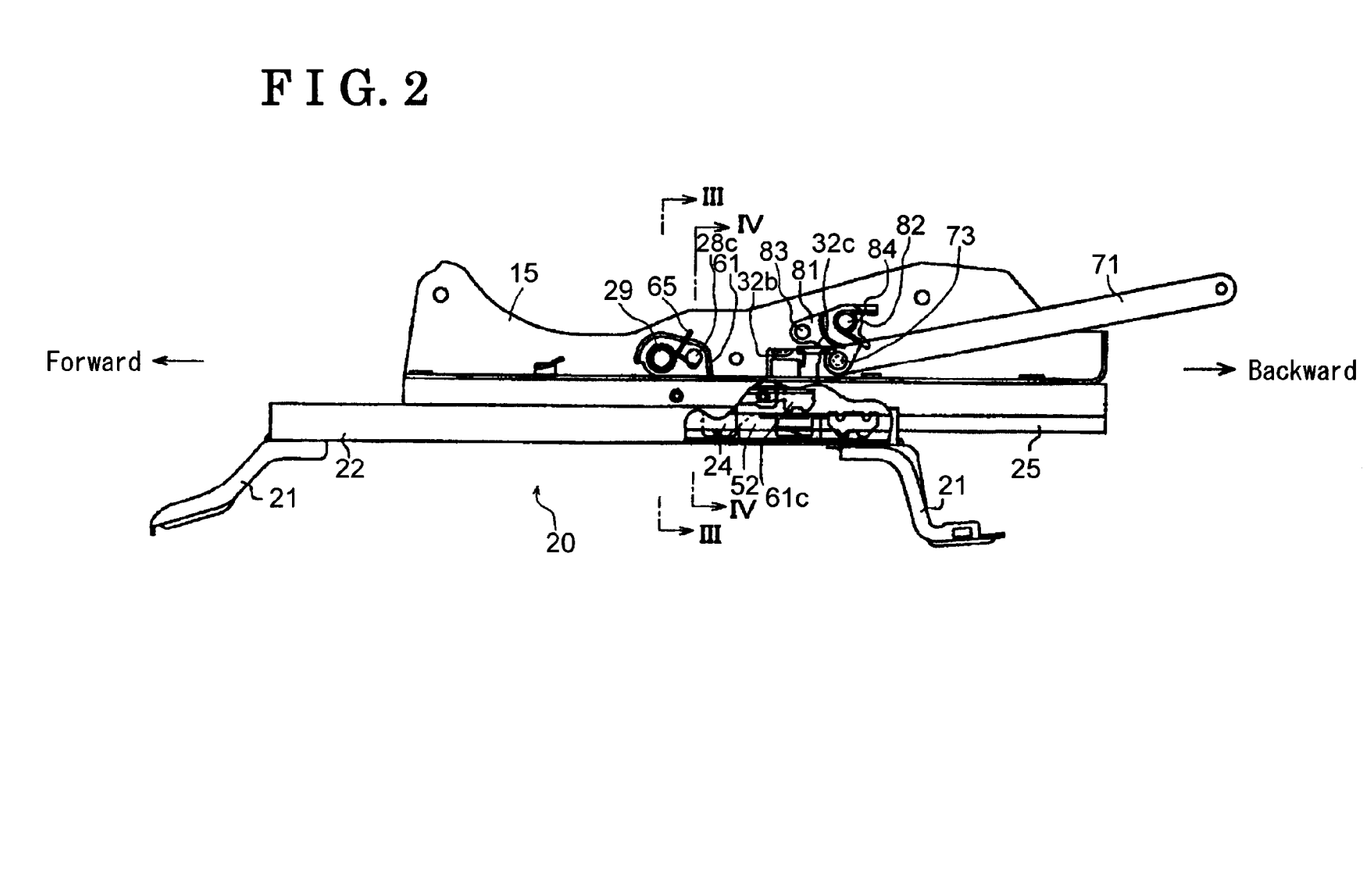
FIG. 2 is a side view of the seat sliding device viewed from outside of the seat.

FIG. 1 is a side view that illustrates one of the pair of sliding devices 20, which is provided to the left of the bottom portion of the seat 10, being viewed from an inner side of the other sliding device 20 facing the sliding device 20 provided to the right of the bottom portion of the seat 10. FIG. 2 is a side view that illustrates the one of the sliding devices 20, which is provided at the left of the bottom portion of the seat 10, being viewed from an outer side of the sliding device 20. The position memorizing mechanism 50 for the walk-in function, which will be described below, is provided to one of the pair of sliding devices 20 respectively provided to the right and the left of the bottom portion of the seat 10. Other structures of the sliding devices 20 are symmetrically provided to each of the sliding devices 20, unless otherwise mentioned. The configuration of the sliding devices 20 will be explained in accordance with the left sliding devices 20 having the position memorizing mechanism 50.

The sliding device 20 has the same configuration as the configuration of a well-known sliding device 20. The sliding device 20 is configured with a lower rail 22 that is fixed on the floor F of the vehicle by means of fixing brackets 21, and an upper rail 25 that is slidable relative to the lower rail 22. A seat bracket 15 is provided to the upper rail 25 so as to extend upwardly in order to support the seat 10. On a surface of the lower rail 22 facing the other sliding device 20 provided at the right of the bottom portion of the seat 10, a plurality of lock holes 23 are formed in a manner where each hole 23 maintain certain intervals therebetween in a longitudinal direction of the lower rail 22.

Figure 5:
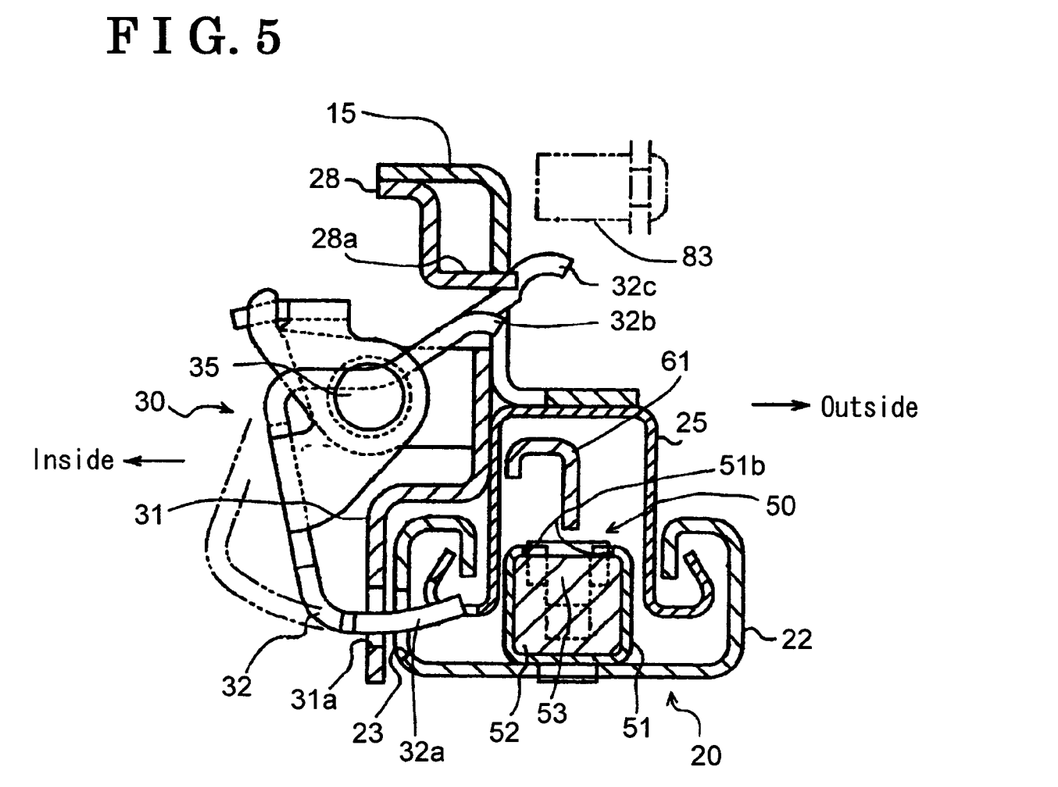
FIG. 5 is a cross-sectional view of the seat sliding device of the embodiment taken along line V-V of FIG. 1.

As shown in FIGS. 1 and 5, a slide locking mechanism 30 (a locking mechanism) is provided at the upper rail 25. The slide locking mechanism 30 includes a supporting bracket 31 fixed to the upper rail 25 and a locking pawl 32 rotatable attached to the supporting bracket 31 by means of a pivot 35 (see FIG. 5). A locking portion 32a is formed on a lower portion of the locking pawl 32. The locking portion 32a substantially horizontally extends toward the lower rail 22. In this embodiment, three locking portions 32a are formed on the locking pawl 32. The locking portions 32a penetrate supporting holes 31a formed on the supporting bracket 31, and then the locking portions 32a are inserted into the lock holes 32 formed on the lower rail 22.

A spring member 33 is arranged between the locking pawl 32 and the supporting bracket 31. The spring member 33 biases the locking pawl 32 so as to rotate the locking pawl 32 in a counterclockwise direction in FIG. 5. Additionally, as shown in FIG. 1, width of each of the locking portions 32a and each of lock holes 23 in the longitudinal direction of the lower rail 22 are set to be approximately the same. As illustrated with a full line in FIG. 5, when the locking portions 32a are inserted into the lock holes 23, relative movement between the lower rail 22 and the upper rail 25 is restricted, and as a result, the sliding device 20 is locked.

As shown in FIG. 1, an unlocking lever 28 (an operating member) is provided to the sliding device 20 for unlocking the slid locking mechanism 30. The unlocking lever 28 is formed so as to extend in a longitudinal direction of the lower rail 22. A rotational shaft 29 is provided on approximately a center of the unlocking lever 28 so that the unlocking lever 28 is rotatably provided on a surface of the seat bracket 15 facing the right sliding device 20 at the right of the bottom portion of the seat 10. A torsion spring 27 is provided between the seat bracket 15 and the unlocking lever 28. The torsion spring 27 exerts biasing force to the unlocking lever 28 in order to move a rear end portion 28a of the unlocking lever 28 upwards and then to rotate the unlocking lever 28 in a clockwise direction in FIG. 1. Additionally, a loop handle 26 (see FIG. 12) is attached to a front end portion 28b of each of the unlocking lever 28. The loop handle 26 connects each unlocking lever 28 attached to each of the sliding devices 20 provided at the right side and the left side of the bottom portion of the seat 10 so that unlocking operations of the both sliding devices 20 provided at the right and the left of the bottom portion of the seat 10 are conducted simultaneously.

A first operated portion 32b is formed on an upper end portion of the locking pawl 32. The first operated portion 32b extends toward the supporting bracket 31 so as to face the locking portion 32a across the pivot 32. As shown with the full line in FIG. 5, when the sliding device 20 is in a locked state, the first operated portion 32b is placed at a position where the first operated portion 32b is spaced away from the rear end portion 28b of the unlocking lever 28 at a certain interval. Then, when the occupant pulls the loop handle 26 (see FIG. 12) upwards in order to unlock the sliding device 20, the front end portion 28b of the unlocking lever 28 is moved upwards so as to press the first operated portion 32b downwardly with the rear end portion 28a of the unlocking lever 28. When the first operated portion 32b is pressed down by the rear end portion 28a of the unlocking lever 28, the locking pawl 32 is tilted to a position illustrated with a chain double-dashed line in FIG. 5. Consequently, the locking portions 32a are disengaged from the lock holes 23, and as a result, the sliding device 20 is unlocked.

When the sliding device 20 is in an unlocked state, the position of the seat 10 is changeable back and forth to any occupant's desired positions. When the occupant releases the loop handle 26 after adjusting the seat position, the locking portions 32a are inserted into the lock holes 23 that correspond to the supporting holes 31a formed on the supporting bracket 31 after the slide locking mechanism 30 is moved. As a result, the sliding device 20 is again locked at the adjusted position of the seat 10.

The position memorizing mechanism 50 for achieving walk-in function is illustrated in FIG. 2 and FIG. 5. As shown in FIG. 5, the position memorizing mechanism 50 includes a sub rail 51 that is provided on a bottom portion of the U-shaped lower rail 22 when the lower rail 22 is viewed at the cross-sectional diagram taken along the line V-V of Fig. The sub rail 51 is formed in a substantial U-shape and relatively smaller size when the sub rail 51 is viewed at the cross-sectional diagram taken along the line V-V of FIG. 1. The sub rail 51 extends in the same direction as the lower rail 22. A bottom portion of the sub rail 51 is fixed on the bottom portion of the U-shaped lower rail 22, as shown in FIG. 5. Length of the sub rail 51 corresponds to an approximate distance the upper rail 25 being moved relative to the lower rail 22.

Figure 10:
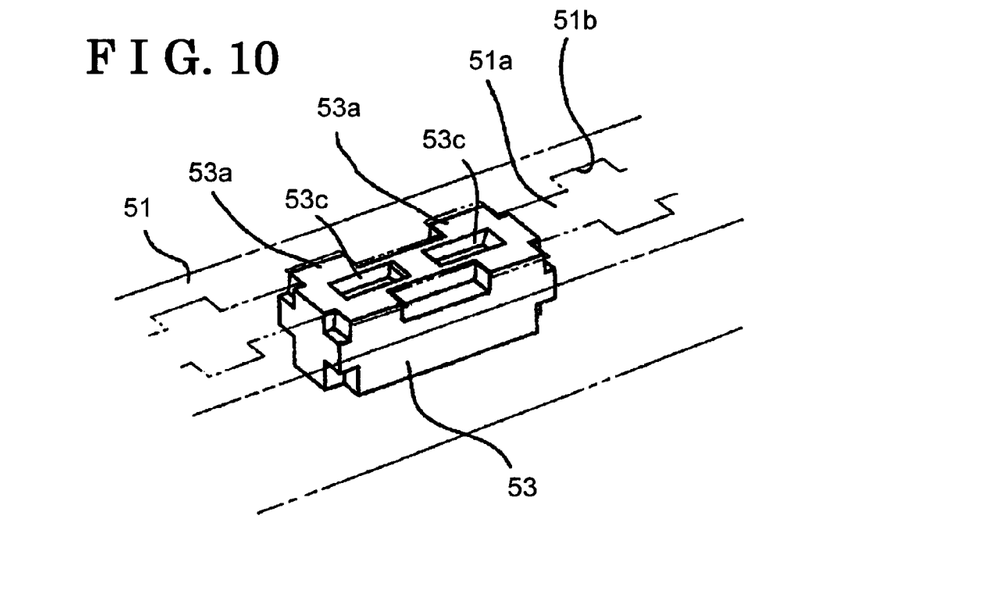
FIG. 10 is a perspective view of the locking piece related to the embodiment.

Additionally, as clearly shown in FIG. 10, a slit 51a is formed on a centre of an upper portion of the sub rail 51 along entire length of the sub rail 51. The slit 51a is formed in a substantially U-shape in cross-section. Further, width of the slit 51a is formed to be narrower than the width of the sub rail 51. Additionally, rectangular shaped notches 51b are formed so as to face each other, and further notches 51b are provided along the slit 51a at certain intervals and in a pectinate from.

Figure 6:
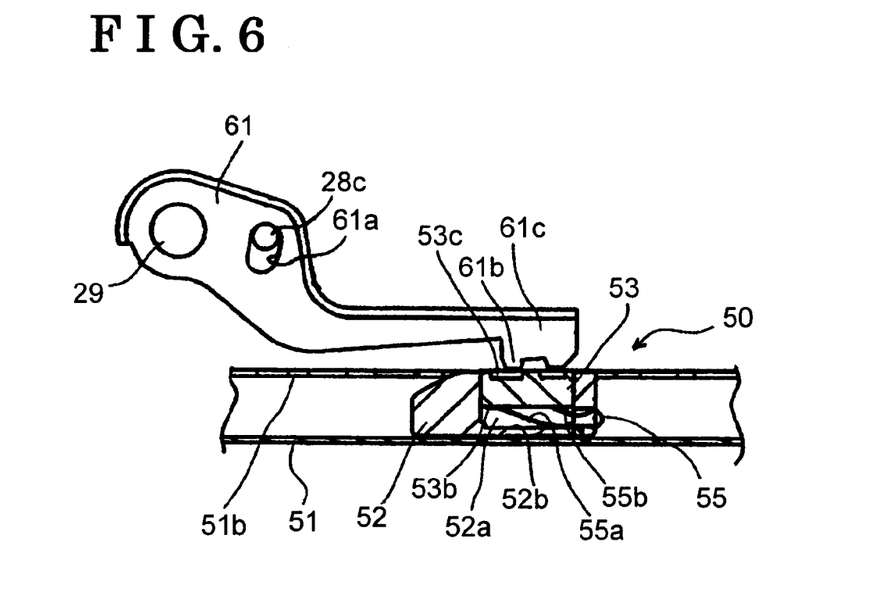
FIG. 6 is a partial side view illustrating a state where a locking piece and a sub rail are engaged.
Figure 7:
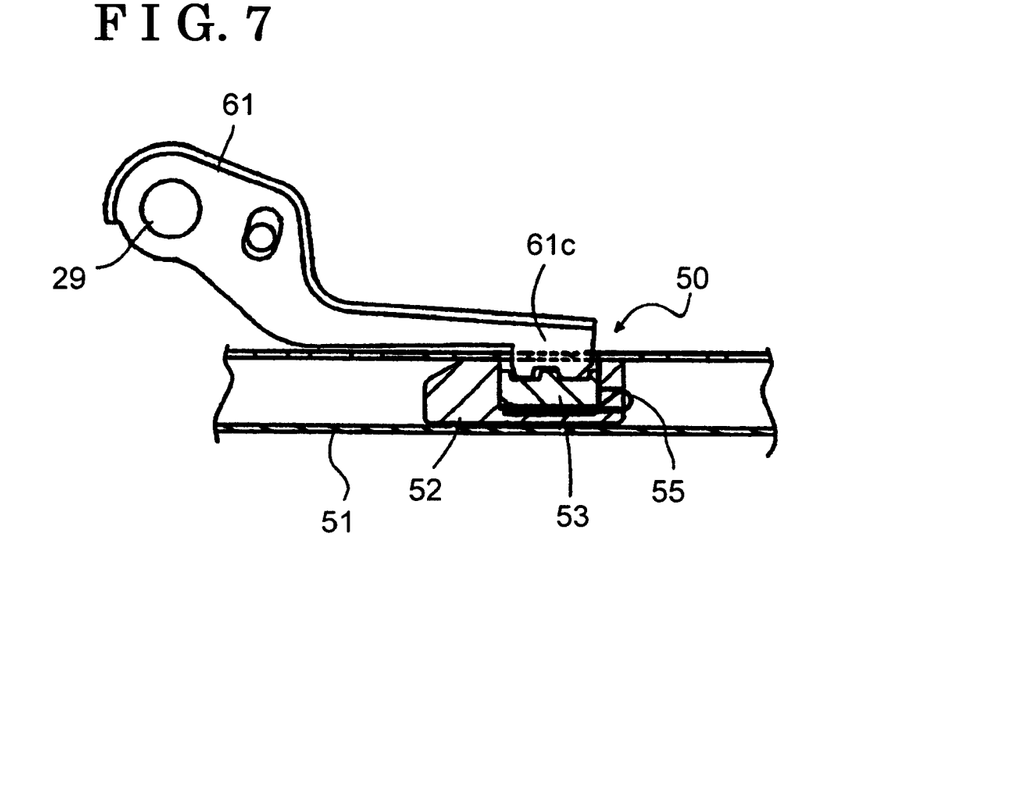
FIG. 7 is a partial side view illustrating a state where the locking piece and the sub rail are disengaged.
Figure 8:
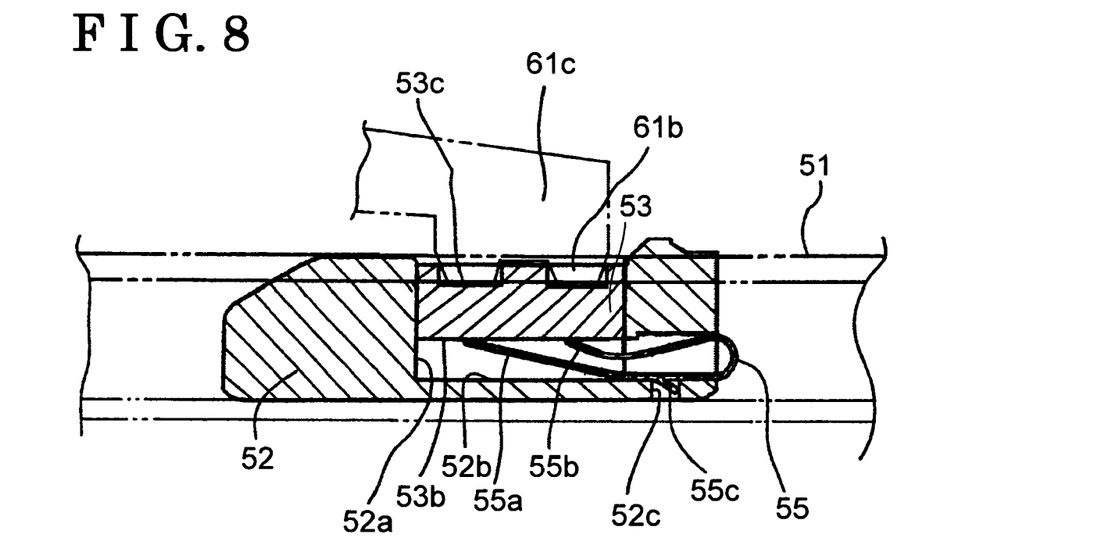
FIG. 8 is a sectional side view of a position memorizing mechanism related to the embodiment.

As shown in FIG. 6 and FIG. 7, a slider 52 (a movable member) is provided at an inner portion, which is formed in an approximately U-shape, of the sub rail 51. The slider 52 is slidable in a longitudinal direction of the sub rail 51. In addition to FIG. 6 and FIG. 7, FIG. 8, which is an enlarged view of FIG. 7, illustrates that a hole 52a in a rectangular shape is formed on the slider 52 so that a locking piece 53 (an engaging member) is accommodated within the hole 52a. Further, the locking piece 53 is guided by the hole 52a so as to be moved only upwards or downwards.

As shown in FIG. 10 in detail, two engaging protrusions 53a are formed on each side of the upper surface of the locking piece 53, that is to say, there are four engaging protrusions 53a formed on an upper surface of the locking piece 53 in total. The engaging protrusions 53a are formed so as to be engageable with the notches 51b formed on the sub rail 51 when the locking piece 53 is moved upward along the hole 52a formed on the slider 52. When the engaging protrusions 53a and the notches 51b are engaged, movement of the slider 52 within the sub rail 51 is restrained.

Figure 9A:
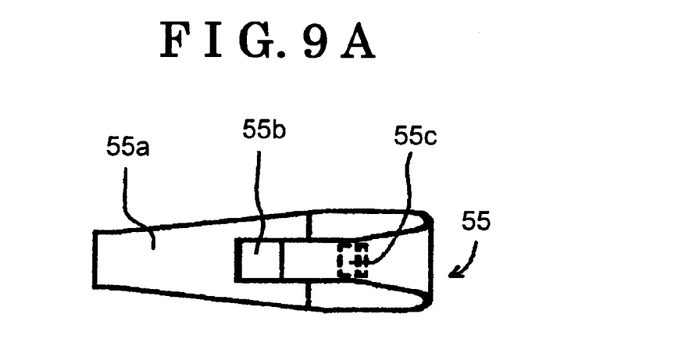
FIG. 9A is a plan view of a spring member provided to the position memorizing mechanism related to the embodiment.
Figure 9B:
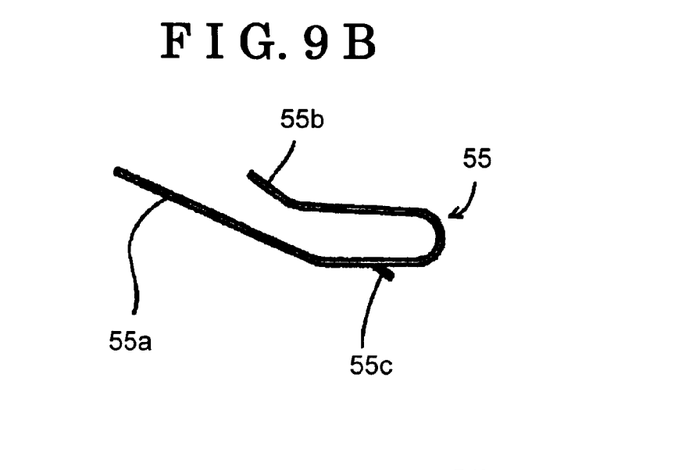
FIG. 9B is a side view of the spring member.

A spring member 55 (a biasing member) is arranged so as to be sandwiched by a lower surface 53b of the locking piece 53 and a bottom surface 52b of the hole 52a. As shown in FIG. 9A and FIG. 9B, the spring member 55 is formed in a curved shape. Specifically, the spring member 55 is curved on a middle portion of a long spring plate material so that both end portions of a long spring plate material extend to one direction towards an inside of the slider 52. A lower portion of the curved spring member 55 functions as a first operating arm portion 55a, and an upper portion of the curved spring member 55 functions as a second operating arm portion 55b that is shorter than the first operating arm portion 55a. Further, each end portion of the first operating arm portion 55a and the second operating arm portion 55b contacts the lower surface 53b of the locking piece 53. Each end portion of the first operating arm portion 55a and the second operating arm portion 55b supports the locking piece 53 at two points thereof in a horizontal direction in FIG. 8 with retaining a certain distance between the points at which the first and the second operating arm portions 55a and 55b support the locking piece 53.

Width of the first operating arm portion 55a is set to be wider than the width of the second operating arm portion 55b, which is shorter than the first operating arm portion 55a, in order to provide spring characteristics to each of the first and the second operating arm portions 55a and 55b for equalizing the biasing force applied to the locking piece 53 by the each of the first and the second operating arm portions 55a and 55b.

A horizontal posture of the locking piece 53 is maintained even when the locking piece 53 is moved up and down, because the locking piece 53 is supported by the first and the second operating arm portions 55a and 55b that apply an approximately equal load to the locking piece 53. Consequently, the locking piece 53 is prevented from being stuck on the hole 52a of the slider 52, which is caused because of the locking piece 53 being inclined. As a result, stable upward and downward slidable movement of the locking piece 53 is secured. Further, the engaging protrusions 53a formed on the locking piece 53 are configured so as to be steadily engaged/disengaged with/from the notches 51b formed on the sub rail 51.

The locking piece 53 is also prevented from being inclined by guiding the locking piece 52 whose height is enlarged in order to increase a contacting surface area between the locking piece 53 and the hole 52a formed on the slider. However, enlarging the height of the locking piece 53 may cause enlargement of each part such as the sub rail 51 being engaged with the locking piece 53. On the other hand, using the above-mentioned spring member 55 that supports the locking piece 53 at the two points enables the locking piece 53 to maintain its stable position while the locking piece 53 is slidably moved up and down. In this configuration, the size of the memorizing mechanism 50 can be relatively smaller, thus further contributing to the reduction of the overall size of the seat position adjusting apparatus 2.

As shown in FIG. 9A and FIG. 9B, the spring member 55 includes a detent portion 55c that is formed by cutting a part of the lower portion of the spring member 55 and then tilting the detent portion 55c away from the lower portion of the spring member 55. On the other hand, a hole 52c is formed on a bottom surface, which extends from the bottom surface 52b formed on the slider 52, for supporting the spring member 55. The detent portion 55c is engaged with the hole 52c. As a result, the spring member 55 is always attached to the slider 52 at an appropriate position, and further, the spring member 55 is prevented from being disengaged from the slider 52.

As shown in FIG. 2, a memorized position releasing lever 61 (a memorized position releasing member) is rotatably attached to the seat bracket 15. The unlocking lever 28 is provided to the surface of the seat bracket 15, and the memorized position releasing lever 61 is provided to the opposite surface of the seat bracket by sharing the rotational shaft 29 with the unlocking lever 28. As shown in FIG. 6 and FIG. 7, the memorized position releasing lever 61 extends backwards from the rotational shaft 29. An elongated hole 61a is formed on the memorized position releasing lever 61 with being spaced from the rotational shaft 29. Furthermore, an arm portion of the memorized position releasing lever 61 extends backwards so as to reach over the locking piece 53. A contacting piece 61c is formed on a rear end portion of the memorized position releasing lever 61.

Figure 4:
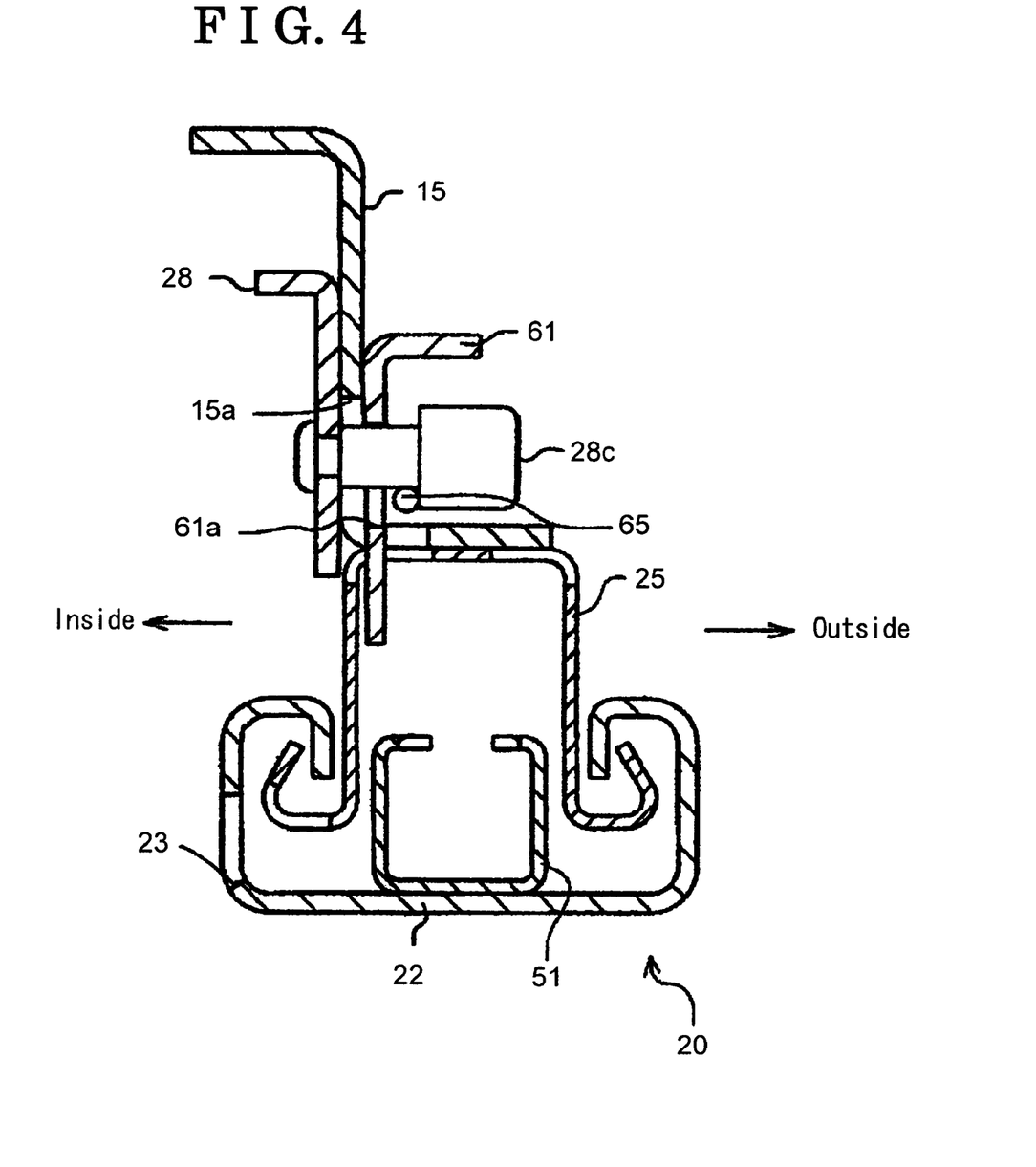
FIG. 4 is a cross-sectional view of the seat sliding device of the embodiment taken along line IV-IV of FIG. 2.

As shown in FIG. 4, a pin 28c is fixed to a surface of the locking lever 28. The pin 28c penetrates an opening portion 15a formed on the seat bracket 15, and then the pin 28c is inserted into the elongated hole 61a formed on the memorized position releasing lever 61.

Figure 3:
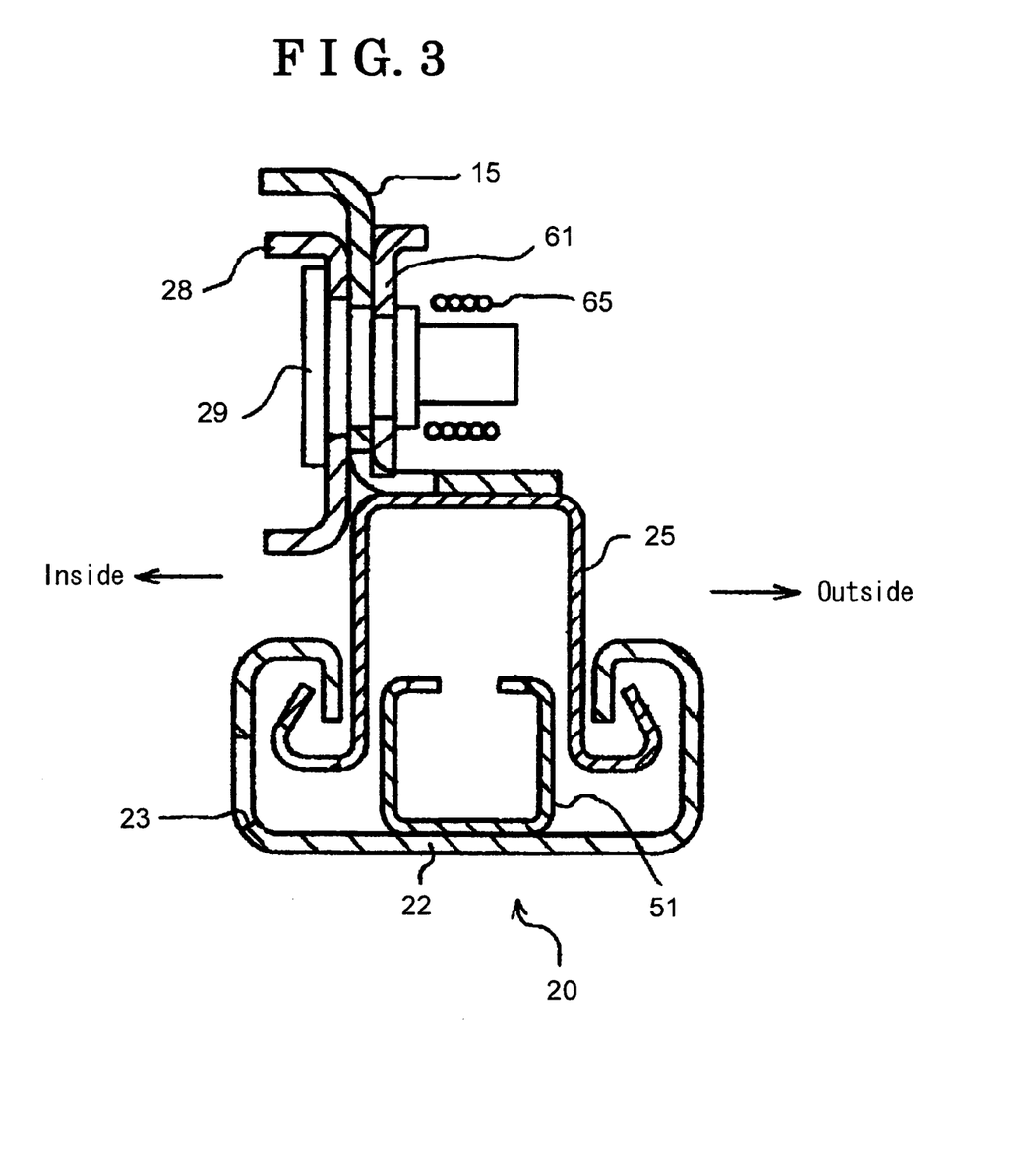
FIG. 3 is a cross-sectional view of the seat sliding device of the embodiment taken along line III-III of FIG. 2.

Additionally, as shown in FIG. 3, a spring 65 is wound around the rotational shaft 29. As shown in FIG. 2, an end of the spring 65 is firmly attached to the memorized position releasing lever 61, and the other end of the spring 65 is engaged at the pin 28c. As shown in FIG. 6, the pin 28a is pushed up to an upper portion of the elongated hole 61a by the biasing force applied by the spring 65.

When the unlocking lever 28 is rotated in order to rotate the locking pawl 32 to the unlocking position illustrated with the chain double-dashed line in FIG. 5, the memorized position releasing lever 61 is integrally rotated with the unlocking lever 28 by means of the rotational shaft 29. Consequently, the contacting piece 61c formed on the memorized position releasing lever 61 contacts the locking piece 53, and then the contacting piece 61c pushes down the locking piece 53 with applying a certain load equivalent to the biasing force generated at the pin 28c by the spring 65.

Additionally, two protruding portions 61b are formed on the contacting piece 61c of the memorized position releasing lever 61, and two recessed portions 53c are formed on an upper portion of the locking piece 53. When the memorized position releasing lever 61 is rotated and pushes down the locking piece 53, the two protruding portions 61b and the two recessed portions 53c are engaged with each other. By holding the locking piece 53 with the two protruding portions 61b and the first and the second operating arm portions 55a and 55b of the spring member 55, the position of the locking piece 53 is further stabilized.

A configuration of an interlocking mechanism 70 for operating the walk-in function will be described below in accordance with FIG. 11 and FIG. 12.

A reclining device 17 is provided to the seat 10 for adjusting an angle of the seat back 12 relative to the seat cushion 11. The reclining device 17 includes a rotational shaft 17a that works as a main function when the reclining device 17 is operated to adjust the angle of the seat 10. An operating piece 17b is provided around the rotational shaft 17a so that the operating piece 17b is integrally rotated with the seat back 12. Additionally, an elongated rotating lever 13 is rotationally attached to the rotational shaft 17a at a central portion of the rotating lever 13. When the seat back 12 stands at the adjusted position of the seat 10, there are slight clearances maintained between an operating piece 17b and an end surface of an upper end 13a of the rotating lever 13. When the seat back 12 is inclined forwards, the operating piece 17b contacts the rotating lever 13. As a result, the rotating lever 13 is rotated in a counterclockwise direction in FIG. 11.

Furthermore, an interlocking rod 71 in an elongate shape extending forward is rotatably connected to a lower end 13b of the rotating lever 13 by means of a pin 72. A front end of the interlocking rod 71 is connected to a walk-in lever 81 by means of a pin 73. The walk-in lever 81 is rotatably provided to the seat bracket 15 by means of the shaft 82. A spring 84 is provided around the shaft 82 (see FIG. 2) in order to generate operation force between the seat bracket 15 and the walk-in lever 81. The spring 84 biases the walk-in lever 81 so as to rotate the walk-in lever 81 in the counterclockwise direction in FIG. 11. Further the spring 84 has a function to maintain the clearance between the rotating lever 13 and the operating piece 17b via the interlocking rod 71 when the seat back is in a upright position.

Figure 11:
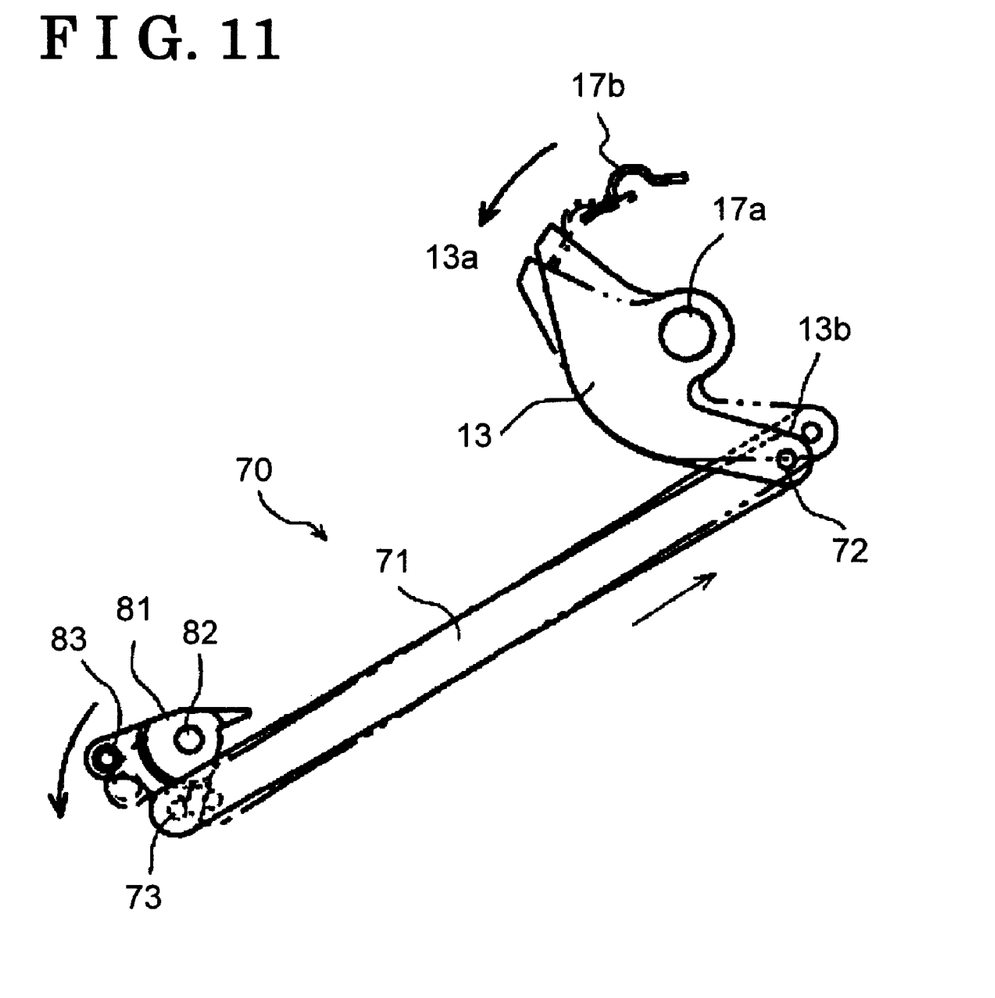
FIG. 11 is a side view of a interlocking mechanism related to the embodiment.

When the seat back 12 is inclined forwards, the interlocking rod 71 is moved backwards in a direction indicated with an arrow illustrated in FIG. 11, and then the walk-in lever 81 is rotated in the counterclockwise direction so as to oppose the biasing force caused by the spring 84. An operating pin 83 is provided to the walk-in lever 81 so as to extend in parallel with the floor F of the vehicle. When the walk-in lever 81 is rotated in the counterclockwise direction, the operating pin 83 is moved downwards. A second operated portion 32c is formed on the upper portion of the locking pawl 32. In FIG. 5, a position of the operating pin 83 is illustrated with a chain double-dashed line. As shown in FIG. 5, the operating pin 83 is positioned over the second operated portion 32c so as to maintain a certain clearance therebetween. With this configuration, when the seat back 12 is inclined forwards, the operating pin 83 is moved downwards, and then the operating pin 83 pushes down the second operated portion 32c. As a result, the locking pawl 32 is rotated to the unlocking position illustrated with the chain double-dashed line in FIG. 5.

An operation of the seat position adjusting apparatus 2 having the above-mentioned configuration will be described below.

The seat sliding mechanism adjusts the positions of the seat 10 forwards and backwards to the occupant's desired position. In order to operate the seat sliding mechanism, firstly the loop handle 26 is pulled upwardly by the occupant, which is followed by the first operated portion 32b of the locking pawl 32 being pushed downwards by the unlocking lever 28. As a result, the slide locking mechanism 30 is unlocked.

When the slide locking mechanism 30 is unlocked, the locking piece 53 is pushed downwards by means of the contacting piece 61c of the memorized portion releasing lever 61 that is integrally rotated with the unlocking lever 28. The locking piece 53 is pushed downwards so as to oppose the biasing force caused by the spring 55. As a result, engagement between the engaging protrusions 53a formed on the locking piece 53 and the notches 51b formed on the sub rail 51 are released. Under the condition where the slide locking mechanism 30 is unlocked, when the occupant applies load either in a forward direction or in a backward direction to the seat 10, the seat 10 is moved in the direction to where the occupant applies the load. Further, under this condition, because the two protruding portions 61b formed on the contacting piece 61c are engaged with the two recessed portions 53c, the slider 52 is moved within the sub rail 51 in conjunction with movement of the seat 10.

When the seat 10 is adjusted to the occupant's desired position, and when the occupant releases the loop handle 26, the slide locking mechanism 30 is locked again. At the same time, the slider 52 is also locked within the sub rail 51 at the position where the slider 52 is stopped after the seat 10 is adjusted.

A walk-in operation will be described below. When the occupant operates the reclining device 17 in order to incline the seat back 12 forwards, the locking pawl 32 is rotated by the operating pin 83 of the walk-in lever 81 being moved downwards and then, by the operating pin 83 pushing down the second operated portion 32c formed on the locking pawl 32. As a result, the slide lock mechanism 30 is unlocked. Then, a sufficient space for the occupant to get on/off the back seat is assured by the occupant moving the seat 10 forwards.

When the walk-in operation is conducted, however, the unlocking lever 28 is not rotated. Therefore, the memorized position releasing lever 61 that is integrally rotated with the unlocking lever 28 is also not rotated. Therefore, the engagement between the locking piece 53 and the sub rail 51 secured by the memorized position releasing lever 61 is not released. As a result, even when the seat 10 is moved forwards, the slider 52 is not moved but stays at a position where the slider 52 is locked when the adjustment of the seat position to the occupant's desired seat position is completed.

As long as the seat back 12 remains inclined forwards, the slide locking mechanism 30 remains unlocked. Therefore, the seat 10 becomes considerably movable. The seat 10 is pushed backwards in order to restore the seat 10 to the original position after the occupant gets on/off the back seat. A backward movement stopper 24 (see FIG. 2) is fixed to the upper rail 25. When the seat 10 is restored to the original position, the backward movement stopper 24 contacts a front end surface of the slider 52. As a result, the seat 10 is restored to the original memorized position. In order to easily maintain the forwardly-inclined state of the seat back 12 until restoration of the seat 10 to the original position is completed, a load generator (not shown) for generating a certain load may be provided to the reclining device 17 for preventing the seat back 12 from being moved to the upright position in a process of restoring the seat 10 to the original position. Additionally, when the position of the seat 10 is adjusted by means of the seat sliding mechanism, the backward movement stopper 24 is moved simultaneously with the slider 52 in a state where the backward movement stopper 24 constantly contacts the slider 52. When the walk-in mechanism is operated, the seat 10 is not moved backwards further than the memorized position of the seat 10, because a distance the seat 10 being moved is restricted by the backward movement stopper 24.

In the above-mentioned position memorizing mechanism 50 provided to the seat position adjustment apparatus 2, the accurate position of the seat 10 is memorized every time the occupant adjusts the seat position, because the horizontal position of the locking piece 53 is stably maintained by supporting the locking piece 53 with the first and the second operating arm portions 55a and 55b of which the length differs from each other. As the adjusted position of the seat 10 is accurately memorized by the position memorizing mechanism 50, the seat 10 is surely restored to the original position after the walk-in operation is completed.

According to the embodiment of the present invention, the spring member 55 includes the first and the second operating arm portions 55a and 55b that support the locking piece 53 by exerting the operation force to the locking piece 53 at the two points thereof that are distant from each other. Therefore, minimization of the locking piece 53 may be achieved, and further the locking piece 53 may be prevented from being inclined when the locking piece 53 is moved upward and downward. As a result, the position memorizing mechanism 50, which is provided to the seat position adjusting apparatus 2, may have stable operation and further, the position memorizing mechanism 50 may be minimized.

Furthermore, according to the embodiment, the spring member 55 having the first and the second operating arm portions 55a and 55b are integrally formed from the single spring plate material. Therefore, the configuration of the spring member 55 is simplified, and as a result, the position memorizing mechanism 50 may be minimized and manufactured at lower costs.

Furthermore, according to the embodiment, an attaching position of the spring member 55 to the locking piece 53 is secured by engaging the detent portion 55c formed on the spring member 55 and the slider 52. As a result, the spring member 55 may be prevented from being displaced from the position where the spring member 55 is provided to the locking piece 53, even if vibration generated by the vehicle is transmitted to the position memorizing mechanism. Therefore, the position memorizing mechanism 50 of the embodiment of the present invention may secure high reliability.

Furthermore, according to the embodiment, the width of each of the first and the second operating arm portions 55a and 55b is formed in proportion to the length of each of the first and the second operating arm portions 55a and 55b so that the operation forces applied to the locking piece 53 by each of the first and the second operating arm portions 55a and 55b are equalized. With this configuration, the locking piece 53 is consistently prevented from being inclined while the locking piece 53 is moved upward and downward, and as a result, the locking piece 53 is moved upward and downward stably.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat position adjusting apparatus for a vehicle comprising:
   a lower rail adapted to be provided on a floor of a vehicle;
   an upper rail adapted to support a seat and being relatively movable with the lower rail;
   a locking mechanism restricting relative movement between the lower rail and the upper rail, and the locking mechanism releases restriction on the relative movement between the lower rail and the upper rail;
   an operating member releasing restriction of the locking mechanism on the relative movement between the lower rail and the upper rail;
   a position memorizing mechanism that memorizes a position of the upper rail relative to the lower rail;
   a memorized position releasing member that releases the position of the upper rail relative to the lower rail memorized by the position memorizing mechanism, when the operating member is operated;
   a sub rail fixed to the lower rail;
   a movable member provided on the position memorizing mechanism and being supported by the sub rail so as to be moved in a position adjusting direction of the seat;
   an engaging member supported by the movable member so as to be engageable/disengageable with/from the sub rail; and
   a biasing member that exerts operation force on the engaging member in order to engage the sub rail and the engaging member when the memorized position releasing member is spaced from the engaging member,
   wherein the biasing member includes a first operating arm portion and a second operating arm portion that are positioned at two points on the engaging member with a predetermined distance maintained therebetween in order to exert the operation force at the two points on the engaging member.

2. The seat position adjusting apparatus for the vehicle according to claim 1, wherein the first operating arm portion and the second operating arm portion include a bent single spring plate.

3. The seat position adjusting apparatus for the vehicle according to claim 2, wherein a detent portion is integrally formed on the biasing member and secures an attaching position of the biasing member relative to the movable member.

4. The seat position adjusting apparatus for the vehicle according to claim 2, wherein the first and the second operating arms comprise an oblong spring plate, and the first operating arm portion is longer than the second operating arm portion, and further, the first operating arm portion is wider than the second operating arm portion.

5. The seat position adjusting apparatus for the vehicle according to claim 4, wherein a detent portion is integrally formed on the biasing member and secures an attaching position of the biasing member relative to the movable member.

6. The seat position adjusting apparatus for the vehicle according to claim 1, wherein a detent portion is integrally formed on the biasing member and secures an attaching position of the biasing member relative to the movable member.

7. The seat position adjusting apparatus for the vehicle according to claim 1, wherein ends of the first and second operating arm portions are linearly arranged one after the other in line with the position adjusting direction of the seat.

8. The seat position adjusting apparatus for the vehicle according to claim 1, wherein first and second operating arm portions comprise an open loop, and a direction of opening of the open loop is toward the engaging member.

9. The seat position adjusting apparatus for the vehicle according to claim 1, wherein first and second operating arm portions apply equal force to the engaging member.

* * * * *